Jan. 4, 1927.  E. N. BRODERICK  1,612,853
TIRE PUMP
Filed Nov. 5, 1920   2 Sheets-Sheet 1

Inventor
Ernest N. Broderick.
By
Attorneys

Jan. 4, 1927.  
E. N. BRODERICK  
1,612,853  
TIRE PUMP  
Filed Nov. 5, 1920  
2 Sheets-Sheet 2
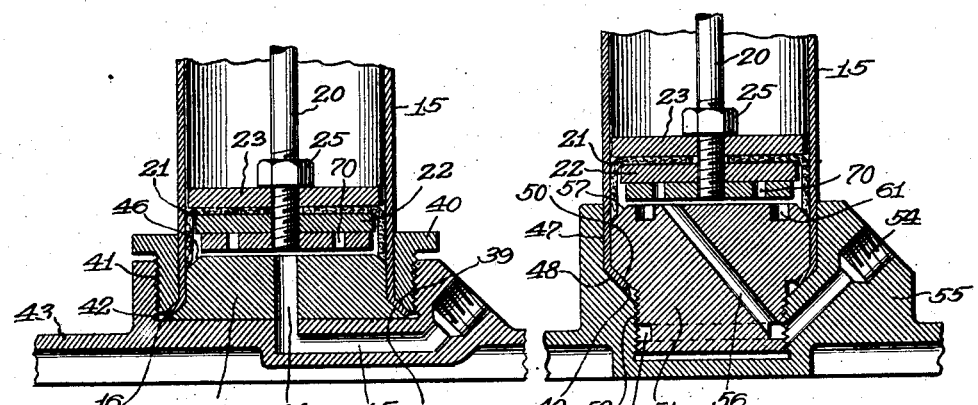
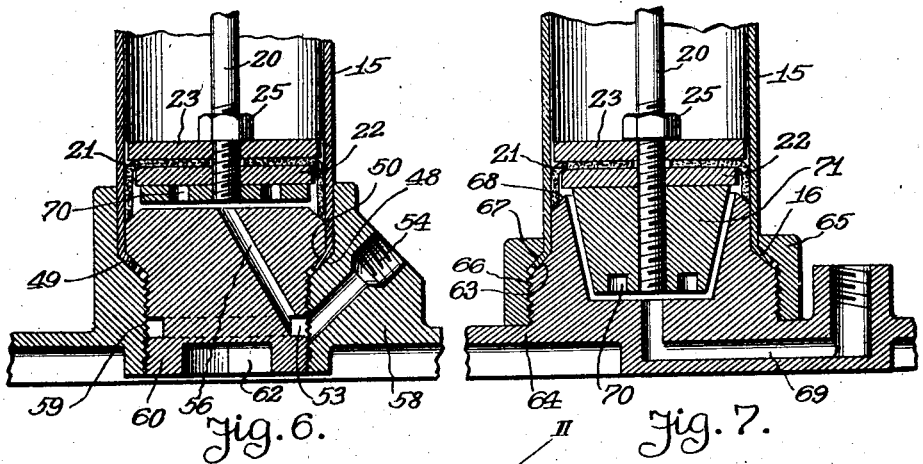
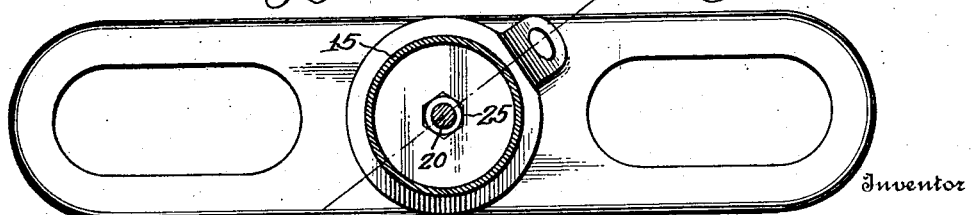
Inventor  
Ernest N. Broderick Patented Jan. 4, 1927.

1,612,853

UNITED STATES PATENT OFFICE.

ERNEST N. BRODERICK, OF DETROIT, MICHIGAN.

TIRE PUMP.

Application filed November 5, 1920. Serial No. 421,894.

This invention relates to a pump for pneumatic tires. It has for its object to provide a simple means by which the pump cylinder may be removably secured to the base whereby access may be had to all parts of the pump for cleaning or repairing. I accomplish this and other objects by the structures shown in the accompanying drawings in which, Figure 1 is a vertical section on line I—I of Fig. 2, of a preferred embodiment of my invention;

Figs 4, 5 and 6 are vertical sections on the line II—II of Fig. 8, showing modified forms of my invention;

Fig. 7 is a vertical section of another modification of my invention; and

Fig. 8 is a plan view of the structures shown in Figs. 4, 5, and 6.

Figure 1:
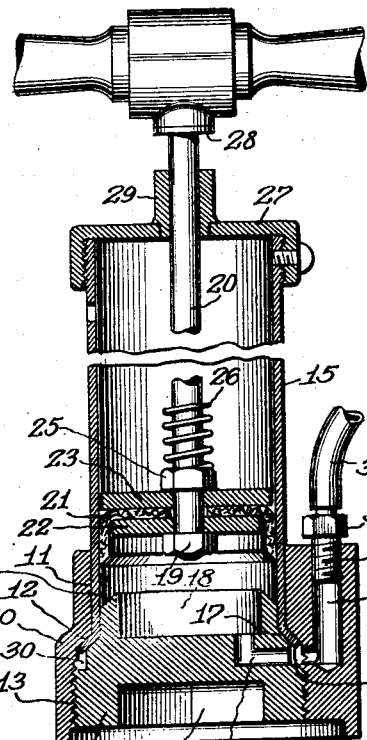

In Fig. 1, the base 10 has a vertical bore 11 provided with a tapering shoulder 12, intermediate of its length. The lower end of the bore is screw-threaded at 13 for engagement with a screw threaded plug 14. The cylinder 15 has an outwardly flaring lower end 16 adapted to engage on its outer surface with the shoulder 12. On its inner surface it is engaged by a tapering surface 17 formed on the plug 14, the arrangement being such that when the plug is screwed into the bore 11, the flaring end 16 is firmly clamped in position between the shoulder and the plug. The upper end of the plug 14 is recessed at 18, to receive the projecting nut 19, on the piston rod 20. This nut 19 acts to clamp the cup washer 21 between a lower fibre washer 22 and an upper washer 23. The lower edge of the leather cup washer 21 is beveled to engage the outwardly beveled end 24 of the plug 14 at the end of its stroke. The inner washer 22 is of the proper size to hold the cup washer against the inside of the cylinder without undue friction while the upper washer 23 is of slightly less diameter than that of the interior of the cylinder 15, thus preventing any upward movement of the outer edge of the cup washer 21. The nut 25 forms an abutment against which the washers are held by the nut 19. Surrounding the piston rod 20, the nut 19 is a coil spring 26 to prevent the plunger from striking the cap 27 secured to the upper end of the cylinder 15. The downward movement of the cup washer is limited by the engagement of a washer 28 with the upper end of a sleeve 29 secured to the cap 27, the arrangement being such that at the downward limit of the stroke, the beveled lower edge of the cup washer comes lightly into contact with the beveled surface 24 which forces it outward toward the cylinder wall and thus acts to maintain it in the correct shape.

An annular groove 30 is formed in the plug 14 just below the beveled surface 17. The recess 18 communicates with the annular groove by means of a passage 31. A suitable delivery tube 32 is attached to a fitting 33 which has screw-threaded engagement at 34 with a passage 35 bored or cored in the base 10. The passage 35 is in communication with the annular groove 30. A socket 36 is formed in the outer end of the plug 14 to receive a wrench.

In many tire pumps the connection between the base and the cylinder has been made by forming screw-threads upon the lower end of the cylinder thus weakening the tube at the point where it is connected to the base which is the point at which the greatest strain occurs in use. In another form of construction, an expanding cup shaped washer has been used on the interior of the cylinder to force its lower end outward into an under cut groove. In this latter construction, it is substantially impossible to remove the tube when it is once set in position and the pump cannot be cleaned out, or repaired when broken.

In the structure I have illustrated, it will be seen that if the cylinder 15 is broken or deformed it may readily be removed from the base by simply unscrewing the plug 14 while the removal of the plug also provides easy access to the interior when cleaning is necessary.

In the modification shown in Fig. 4, the cylinder 15 has its end flared at 16 in the same manner as in the structure just described but instead of engaging the base directly as in the previous case its inner surface engages a beveled shoulder 37 formed on a block 38 and the outer beveled surface is engaged by the beveled portion 39 of a bushing 40 having screw-threaded engagement at 41 with a socket 42 in the base 43. The plug 38 has a central opening 44, communicating with a cored passage 45 in the base. The outer end of the passage 45 extends upward at an angle of forty-five degrees and is screw-threaded to receive a fitting such as shown in Fig. 1. The plug 38 has its upper edge beveled at 46 to engage the cup washer 21 for the same purpose as described in connection with the beveled surface 24 shown in Fig. 1.

The modification shown in Fig. 5 comprises a base having a socket 47 formed with a beveled shoulder 48. The cylinder 15 has its lower end bent inwardly at 49, the outer surface of the inwardly bent portion engaging the bevel 48. The inner surface of the portion 49 is engaged by a beveled shoulder 50 of a plug 51 having screw-threaded engagement at 52 with the interior of the socket 47. The plug has an annular groove 53 communicating with a passage 54 in the base 55 and a passage 56 connects the annular groove 53 with the upper surface of the plug. The upper edge of the plug is beveled at 57, for engagement with the edge of the cup washer 21.

The modification shown in Fig. 6 is substantially identical with that shown in Fig. 5, the only differences being in the construction of the base 58 in that the recess extends all the way through the base as indicated at 59 so that the plug 60 may be engaged by a wrench from underneath the base instead of from the interior of the cylinder. In Fig. 5, an appropriate recess 61 is provided in the upper surface of the plug to receive the end of a wrench or screw driver inserted from the top of the cylinder 15, before the piston is inserted. In Fig. 6, a recess 62 is formed in the lower end of the plug which may be engaged by a tool applied from underneath.

In Fig. 7, the cylinder 15 has an outwardly flaring portion 16 as in the forms shown in Figs. 1 and 4, and the inner face of the flaring portion engages a beveled shoulder 63 formed on the base 64. A clamping ring 65 is in screw-threaded engagement at 66, with the base below the bevel 63, and this clamping ring has a beveled inner surface 67, which engages the outer face of the flaring portion 16 of the cylinder. Above the beveled portion 63, the base has another beveled surface 68 positioned to engage the cup washer 21 in substantially the same manner and for the same purpose as does the surface 24 in Fig. 1. The base has a passage 69 screw-threaded at its outer end to receive a fitting for the air delivery tube.

It is desirable that the least possible amount of air shall remain in the pump beneath the piston at the lower end of its stroke, and to this end the nut which secures the lower washer 22 to the piston rod 20 is made of such shape as to fill any air space that may remain between the plunger and the base at the lower end of the piston stroke. In Figs. 4, 5, and 6, this nut is shown as broad and flat with appropriate recesses 70 to be engaged by a wrench. In Fig. 7 the nut 71, is shown as tapered and of a size which will nearly fill a correspondingly shaped opening in the base.

Figure 2:
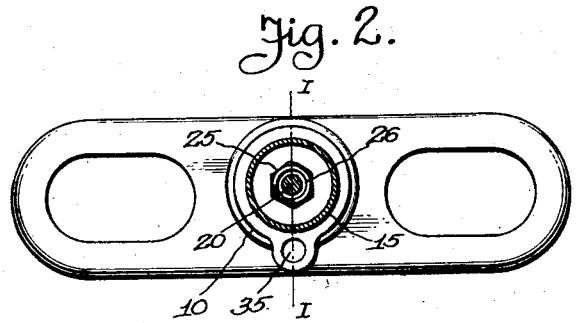
Fig. 2 is a plan view thereof, the cylinder being in section.
Figure 3:
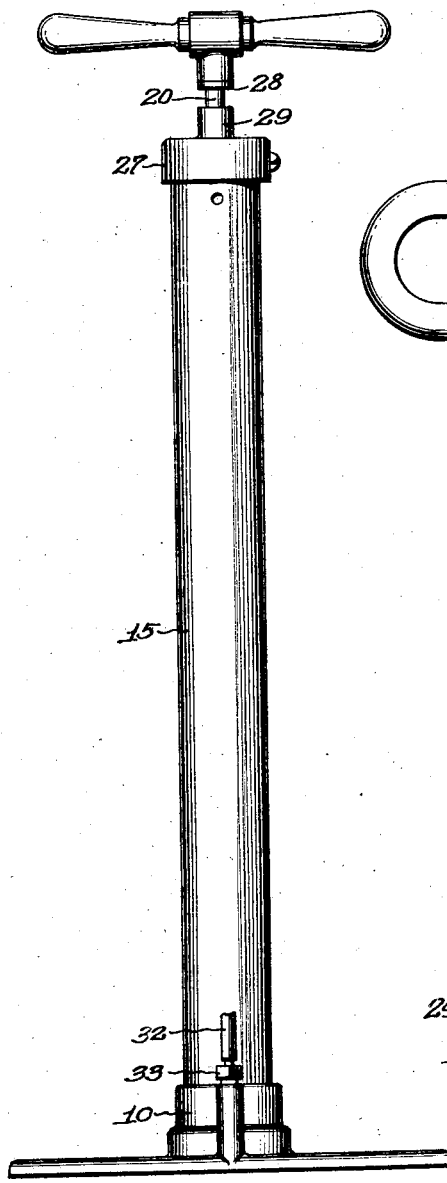
Fig. 3 is an elevation.

As shown in Fig. 2, the projecting portion 70 of the base to which the air passage leads to receive a fitting 33 may extend directly outward at right angles to the length of the base or as shown in Fig. 8, this opening may be arranged at an angle of forty-five degrees to the length of the base, the latter being the preferred position since the base may thus be made as narrow as possible and the fitting will not be in the way of the foot of the user.

It will be noted that the leather cup washer 21 has a central opening 72 of sufficient size to insure that it will not be in contact with the piston rod 20, and the washers 22 and 23 are made of fibre to keep the leather from contact with the nuts above and below. This arrangement effectually prevents the washer from absorbing rust from the piston rod or the nuts, such rust being a common cause of hardening and deterioration of leather in pumps.

It will be understood that many variations may be made in the details of the structure herein illustrated without departing from the spirit of the invention, and I do not therefore wish to be limited except as necessitated by the terms of the claims when construed broadly.

What I claim is:—

1. A tire pump comprising a cylinder, a base member formed with an upwardly projecting annular wall extending into one end of said cylinder, the upper end surface of said wall being inclined downwardly and outwardly to meet the inner surface of the cylinder, a piston in the cylinder, and a cup washer carried by the piston and extending downwardly in contact with the inner surface of the cylinder, said cup washer having a bevelled edge adapted to engage the inclined surface on the base member at the end of the stroke of the piston, said inclined surface serving to force the cup member toward and into firm contact with the inner surface of the cylinder at the lower end of the stroke of the piston.

2. In a tire pump, a base having a tubular opening therethrough, a cylinder arranged in one portion of the tubular opening and clamped to the base by a screw-threaded fastening means having an annular groove around its outer periphery, a portion of the base having a passage extending therethrough, and communicating with the annular groove and the fastening means having a passage therethrough communicating at one end with the annular groove and at the other end with the cylinder.

3. A tire pump comprising a base member having an opening therethrough of circular form in cross section, with two portions of different diameters meeting in an inclined shoulder, a cylinder secured at one end within the opening in the base member with the inner end of the cylinder deflected into contact with the shoulder, a second base member engaged within the opening in the first base member and having an annular shoulder to engage the deflected end portion of the cylinder and clamp said end portion between the shoulders on the two base members, said inner base member being formed with an end portion extending upwardly within the cylinder and provided with an end surface inclined downwardly and outwardly to meet the inner surface of the cylinder, a piston in the cylinder, a cup washer carried by the piston with a depending edge portion in contact with the inner surface of the cylinder and adapted to engage the inclined surface on the inner base member when the piston reaches the lower end of its stroke to force the depending portion of the cup washer outwardly into firm contact with the inner surface of the cylinder.

4. A tire pump comprising a base having a tubular opening therethrough, the opening having two cylindrical portions of different diameter connected by a shoulder, a cylinder arranged within one of the cylindrical portions and having its end portion deflected to engage the shoulder and a fastening means having a screw-threaded portion engaging one of the cylindrical portions of the base and having a shoulder engaging the end of the tube to clamp it against the shoulder of the base, the fastening means having an annular groove around its periphery and having an opening connecting the annular groove with the interior of the cylinder, and the base having a passage therethrough communicating with the annular groove.

In testimony whereof I affix my signature.

ERNEST N. BRODERICK.